United States Patent

Sato

[15] 3,702,907

[45] Nov. 14, 1972

[54] DEVICE FOR AUTOMATICALLY PREVENTING THE ERASING OF A TAPE IN A TAPE CASSETTE

[72] Inventor: Masaaki Sato, Tokyo, Japan

[73] Assignee: Olympus Optical Co., Ltd., Tokyo, Japan

[22] Filed: May 28, 1970

[21] Appl. No.: 41,352

[30] Foreign Application Priority Data

May 30, 1969 Japan ......................44/49658
Aug. 9, 1969 Japan ..................44/75359

[52] U.S. Cl.........179/100.2 Z, 179/100.2 D, 274/4 C
[51] Int. Cl.........................G11b 15/04, G11b 23/04
[58] Field of Search ................179/100.2 D, 100.2 Z; 242/55.19 A, 200; 274/4 C, 11 C

[56] References Cited

UNITED STATES PATENTS

| | | | |
|---|---|---|---|
| 2,466,514 | 4/1949 | Vagtborg | 179/100.2 D |
| 3,550,983 | 12/1970 | Probst | 179/100.2 Z |
| 2,612,565 | 9/1952 | Heller | 179/100.2 D |
| 3,037,093 | 5/1962 | Nowlan | 179/100.2 D |

*Primary Examiner*—Bernard Konick
*Assistant Examiner*—Alfred H. Eddleman
*Attorney*—Kelman and Berman

[57] ABSTRACT

Device for automatically preventing the erasing of information recorded on a tape in a tape cassette having an encoding recess in which a fin is selectively provided for indicating that the information on the tape may not be erased when no fin is provided in the recess, the existence or the lack of the fin being sensed by the detecting nose of a detecting mechanism provided in a tape recorder to be used with the tape cassette so as to control the tape recorder. The detecting nose is normally held out of the encoding recess when the cassette is loaded on the tape recorder but, when a recording knob for moving an erasing head to its operative position is actuated, the detecting nose is actuated for sensing encoding recess so that proper operation of the tape recorder is insured while the cassette is loaded and released without any obstruction by the detecting nose.

21 Claims, 28 Drawing Figures

INVENTOR.

Masaaki Sato
By: Kelman and Berman
AGENTS

INVENTOR.

Masaaki Sato

BY: Kelman and Berman

AGENTS

INVENTOR,
Masaaki Sato
BY: Kelman and Berman
AGENTS

INVENTOR.
Masaaki Sato
BY: Kelman and Berman
AGENTS

INVENTOR.
Masaaki Sato
BY: Kelman and Berman
AGENTS

INVENTOR,
Masaaki Sato
BY: Kelman and Berman
AGENTS

INVENTOR.
Masaaki Sato
BY: Kelman and Berman
AGENTS

INVENTOR
Masaaki Sato
BY: Kelman and Berman
AGENTS

INVENTOR.
Masaaki Sato
BY: Kelman and Berman
AGENTS

INVENTOR,
Masaaki Sato
BY: Kelman and Berman
AGENTS

INVENTOR.
Masaaki Sato
BY: Kelman and Berman
AGENTS

DEVICE FOR AUTOMATICALLY PREVENTING THE ERASING OF A TAPE IN A TAPE CASSETTE

BACKGROUND OF THE INVENTION

The present invention relates to a device for automatically preventing the erasing of informations recorded on a tape loaded in a tape cassette for use with a tape recorder.

There are two kinds of tape cassettes for use with a cassette type tape recorder, one of which is exclusively for the reproducing purpose such as for reproducing music or symphony recorded on the tape by famous musicians which may not be erased for the later reproducing operation, while the other type is for both the recording purpose and the reproducing purpose in which the information recorded on the tape must be erased each time the recording operation is to be carried out.

In order to distinguish the tape cassette for both the recording and reproducing purposes from that exclusively for the reproducing operation, it has been proposed to provide an encoding recess in a side wall of the casing of the tape cassette in which a fin is selectively provided to close the encoding recess so that, when a fin is provided in the recess, indication is given that the information recorded on the tape loaded in the cassette may be erased for further recording other information thereon while, when no fin is provided in the recess, it indicates that the information recorded on the tape may not be erased so as to maintain the information for further reproducing purpose. The provision of the fin in the encoding recess or the removal of the fin from the recess is detected by a detecting mechanism provided in the tape recorder when the cassette is loaded on the tape recorder so that the erasing of the information is prevented when the detecting mechanism detects that no fin is provided in the encoding recess of the tape cassette.

In the prior art detecting mechanism, however, it is difficult to load and release a tape cassette from the tape recorder having the detecting mechanism because a detecting nose of the detecting mechanism is located at all times in the path of movement of the cassette for loading and releasing the same from the tape recorder. Particularly, it is impossible to provide a detecting mechanism in a tape recorder of the type on which a tape cassette is loaded by moving the same toward the tape recorder in the direction perpendicular to the upper surface of the casing of the tape cassette with the upper surface of the cassette held in parallel to the upper surface of the tape recorder.

Further, in the prior art tape recorder having the detecting mechanism as described above, it is impossible to set the tape recorder for the recording operation when no cassette is loaded on the tape recorder, because the detecting nose of the detecting mechanism is urged to a position in which the operation for the recording is prevented by the detecting mechanism. This is very inconvenient when the operation of the tape recorder is to be taught to an inexperienced user.

The present invention aims at avoiding the above described disadvantages of the prior art tape recorder.

SUMMARY OF THE INVENTION

An object of the present invention is to provide a novel and useful device for automatically preventing the erasing of information recorded on a tape of a tape cassette having an encoding recess when the same indicates that the information should not be erased for further reproducing operation.

Another object of the present invention is to provide a novel and useful device of the type described above which does not obstruct the loading and unloading of the tape cassette from the tape recorder.

Still another object is to provide a novel and useful device of the type described above which permits the tape recorder to be set for the recording operation even though no tape cassette is loaded on the tape recorder.

The above objects are achieved in accordance with the present invention by a device for preventing the erasing of the informations on the tape in a tape cassette having an encoding recess for use with a tape recorder having a cassette loading deck movable from a first position in which the deck is substantially flush with the outer surface of the casing of the tape recorder to a second position in which the cassette loaded on the deck is releasably locked in the operative position on the tape recorder with the upper surface of the cassette being substantially flush with the outer surface of the tape recorder, the device being principally characterized by a detecting lever having a detecting nose for sensing the encoding recess of the cassette loaded on the tape recorder which is normally held in a position in which the detecting nose is held apart from the encoding recess for facilitating the loading of the cassette but is moved toward the recess for sensing the same when the operation of a recording knob for moving an erasing head to its operative position is commenced so that the operation of the recording knob is prevented when no fin is provided in the encoding recess which is sensed by the detecting nose thereby permitting the erasing head to be maintained in its inoperative position.

Other objects and advantages will be apparent from the following description when read with reference to the accompanying drawings illustrating various embodiments of the present invention.

DETAILED DESCRIPTION OF THE PREFERRED EMBODIMENTS

Figure 1:
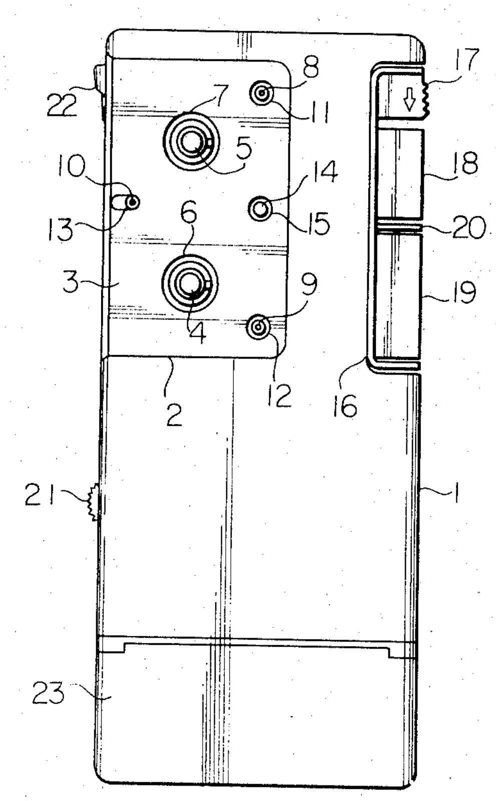
FIG. 1 is a general front view of a tape recorder of the present invention.

Referring to the drawings, particularly to FIG. 1, the tape recorder incorporating therein the device of the present invention comprises a casing 1 having an opening 2 in which a cassette loading deck 3 is movably located. Deck 3 is movable between a first position in which the upper surface of deck 3 is flush with the outer surface of casing 1 and a second position in which the upper surface of a tape cassette 24 (FIG. 2) loaded on deck 3 is flush with the outer surface of casing 1 and cassette 24 is releasably locked in its operative position by guide pins 8, 9, 10 provided in the tape recorder and projecting therefrom to pass through openings 11, 12, 13 in deck 3 and openings 11', 12', 13' in cassette 24. Deck 3 is normally urged to the first position by spring means. Guide pin 10 is movable and normally urged by spring means toward pins 8, 9 so as to lock cassette 24 in its operative position in cooperation with pins 8, 9 when deck 3 loading thereon cassette 24 is moved to the second position. Guide pin 10 is actuated by cassette releasing knob 22 so as to be moved away from pins 8, 9 so that cassette 24 is unlocked thereby permitting deck 3 to be springingly moved to its first position together with cassette 24, thus allowing the same to be automatically removed from the tape recorder. To this end, openings 13, 13' are made in the form of elongated holes.

In the conventional manner, a capstan 14 projects from the tape recorder and passes through opening 15 of deck 3 and openings 15' of cassette 24 so as to drive the tape in cassette 24 in cooperation with a pinch roller (not shown) provided in the tape recorder when the same is brought to its operative position, while reel driving spindles 4, 5 pass through openings 6, 7 of deck 3 and openings 6', 7' in cassette 24 so as to take up the tape on either of tape reels in cassette 24 when the tape recorder is operated.

A recording knob 17 for moving an erasing head to its operative position, a recording/reproducing knob 18 for moving a recording/reproducing head to its operative position and a stopping knob 19 for returning recording knob 17 and/or recording/reproducing knob actuated and held in their actuated positions to their inoperative positions are provided in opening 16 of casing 1. Also, a volume control knob 21 is provided. An electric source 23 is detachably mounted on casing 1 as shown in FIG. 1.

Figure 2:
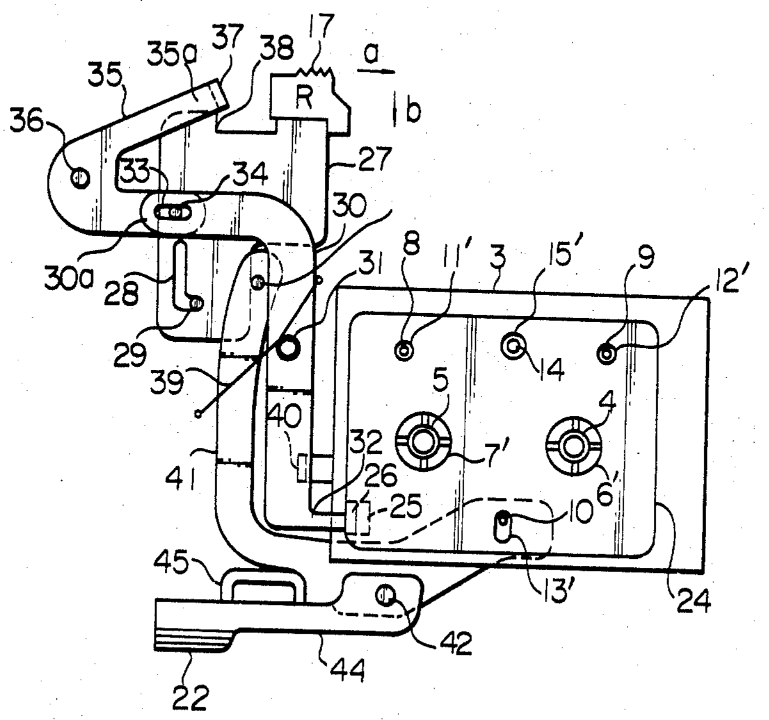
FIG. 2 is a fragmentary view showing the arrangement of an embodiment of the device of the present invention.
Figure 3:
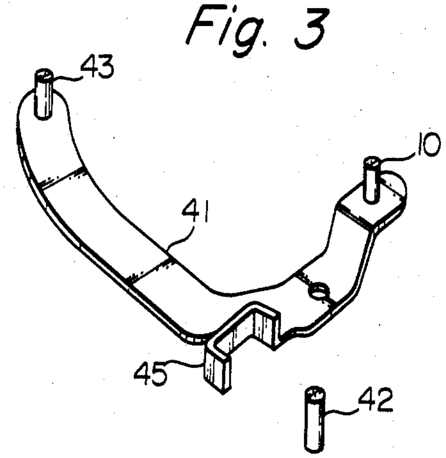
FIG. 3 is a perspective view of the cassette releasing lever used in the device of FIG. 2.

Referring to FIG. 2 illustrating an embodiment of the device of the present invention, a or detecting lever 30 of Z-shape is pivoted at 31 in the tape recorder and a detecting nose 32 is provided at one end of lever 30 while an elongated hole 33 is formed at the other end 30*a* of lever 30. Detecting nose 32 is so positioned that it is moved into an encoding recess of a cassette 24 loaded on cassette loading deck 3 when lever 30 is swung in the anticlockwise direction as seen in FIG. 2. To this end, a spring 39 is provided around pivot shaft 31 with one end secured to lever 30 while the other end is secured to a stationary portion in the tape recorder so as to urge lever 30 in the anticlockwise direction. A second or latching lever 35 in the C-shape is pivoted at 36 in the tape recorder and a pin 34 is secured at its one end which slidably fits in elongated hole 33 of lever 30 so that lever 35 is swung in the clockwise direction when lever 30 is swung in the anticlockwise direction. The opposite end 35*a* of lever 35 is provided with a depending lug 37. A third lever 41 in the L-shape is pivoted at 42 and guide pin 10 is secured to one end of lever 41 while a pin 43 is secured to the other end of lever 41. Lever 41 is provided with a U-shaped bracket 45 as shown in FIGS. 2 and 3. A cassette releasing lever 44 provided with cassette releasing knob 22 at its one end is also pivoted at 42. When knob 22 is actuated to swing lever 44 in the clockwise direction, lever 44 abuts against bracket 45 so as to swing lever 41 in the same direction so that pin 43 abuts against lever 30 to swing the same in the clockwise direction against the action of spring 39 so as to move detecting nose 32 away from recess 25 of cassette 24 while guide pin 10 is moved apart from guide pins 8, 9 so as to release cassette 24.

Recording knob 17 is mounted on a shift plate 27 which is provided with L-shaped slot 28 in which a pin 29 secured to the tape recorder slidably fits so that shift plate 27 together with knob 17 can be moved first in a first direction a and then moved in a second perpendicular direction b so as to bring the erasing head (not shown) to its operative position.

The movement of knob 17 in the second direction is prevented until knob 17 has been moved in the first direction and the movement of knob 17 in the first direction does not cause the erasing head to be moved to its operable position but the movement of knob 17 in the second direction causes the erasing head to its operable position. As shown in FIG. 2, a cut-out portion 38 is formed in shift plate 27 at its outer side edge adjacent to depending lug 37 of second lever 35. Depending lug 37 is normally held apart from cut-out portion 38 when lever 30 is in its anticlockwise rotated position so that recording knob 17 is allowed to be moved in the first direction, whereas recording knob 17 is prevented from moving in the first direction by the engagement of depending lug 37 with cut-out portion 38 when lever 30 is swung in the anticlockwise direction and, hence, lever 35 is rotated in the clockwise direction. The arrangement of lever 30, lever 35, shift pate 27 and cassette 24 loaded on deck 3 is so determined that, when no fin is provided in recess 25 of cassette 24, detecting nose 32 moves into recess 25 so that lever 30 is swung in the anticlockwise direction and lever 35 is rotated in the clockwise direction so as to bring depending lug 37 into cut-out portion 38 thereby preventing recording knob 17 from moving in the first direction, while, when a fin 26 is provided in recess 25, the movement of lever 30 in the anticlockwise direction is limited by the abutment of detecting nose 32 against fin 26 so that lever 35 is held in such a position to maintain depending lug 37 spaced apart from cut-out portion 38 thereby permitting recording knob 17 to be moved in the first direction so that the erasing head is brought to its operative position by moving recording knob 17 in the second direction.

The operation of the device of FIG. 2 is clear from the above description. When a cassette 24 in which no fin is provided in recess 25 is loaded on deck 3 and locked in its operative position, detecting nose 32 enters recess 25 so that lever 30 and lever 35 are rotated to the extent that depending lug 37 moves into cut-out portion 38 so as to prevent recording knob 17 from being moved in the first direction thereby preventing the erasing head from being brought to its operative position. On the other hand, when a fin 26 is provided in recess 25, the movement of levers 30, 35 is limited to prevent depending lug 37 from entering cut-out portion 38 so that recording knob 17 can be moved in the first direction thereby permitting the erasing head to be brought to its operative position by moving recording knob 17 in the second direction.

When cassette 24 is to be removed, cassette releasing knob 22 is actuated so that lever 44 and, hence, lever 41 is rotated in the clockwise direction to move guide pin 10 so as to release cassette 24 while pin 43 urges lever 30 in the clockwise direction so that detecting nose 32 is moved from recess 25 to permit cassette 24 to be released without obstruction by detecting nose 32.

In the embodiment shown in FIG. 2, a depending lug 40 is secured to deck 3 at its one side edge facing to lever 30. Depending lug 40 abuts against lever 30 when deck 3 is held in its first position, i.e., in its lifted position, so that lever 30 is prevented from rotating in the anticlockwise direction to maintain depending lug 37 of lever 35 in disengaged relation from cut-out portion 38 thereby permitting recording knob 17 to be actuated when no cassette is loaded on the tape recorder.

FIGS. 4 – 7 show another embodiment of the device of the present invention. In this embodiment, shift plate 46 mounting thereon recording knob 17 has an elongated hole 47 in which a pin 47' secured to a stationary portion of the tape recorder is slidably fitted. A pin 161 is secured to shift plate 46 which slidably fits in L-shaped slot 162 formed in the tape recorder as shown so that recording knob 17 can first be moved in the first direction toward recording/reproducing knob 18 and then moved in the second direction toward the interior of the tape recorder. Shift plate 46 is normally urged in the direction downwardly and rightwardly by a spring 49 having one end secured to shift plate 46 with the other end secured to a stationary portion in the tape recorder. Shift plate 46 is formed with a projecting ear 159 at its inner end and a shoulder 160 at its one side edge. A detecting lever 163 is pivoted at 166 and has a detecting nose 165 at its one end while the opposite or latching end 164 is located adjacent to shoulder 160 of shift plate 46. Detecting lever 163 is normally urged in the anticlockwise direction by a spring 167 having one end secured to lever 163 with the other end secured to a stationary portion in the tape recorder so that detecting nose 165 is urged to move into recess 25 of cassette 24 loaded on deck 3 and locked in its operative position, but detecting nose 165 is held a distance spaced from recess 25 by ear 159 of shift plate 46 abutting against lever 163 when recording knob 17 is held in its initial position. When ear 159 is moved away from lever 163, lever 163 is swung in the anticlockwise direction by the action of spring 167 so that detecting nose 165 is moved into recess 25. The arrangement of detecting nose 165, lever 163, ear 159 and shift plate 46 having shoulder 160 is so determined that, when no fin is provided in recess 25, detecting lever 163 is swung in the anticlockwise direction to the extent that the opposite end 164 of lever 163 will abut against shoulder 160 of shift plate 46 when recording knob 17 is moved in the first direction, i.e., in the direction toward recording/reproducing knob 18, thereby preventing recording knob 17 from being moved in the second direction, i.e., in the direction toward the interior of the tape recorder so that the erasing head is kept in its inoperative position. On the other hand, when a fin 26 is provided in recess 25, the movement of detecting lever 163 is limited by the abutment of detecting nose 165 against fin 26 when recording knob 17 is moved in the first direction so that opposite end 164 of lever 163 does not engage with shoulder 160 thereby permitting recording knob 17 to be moved in the second direction for bringing the erasing head to its operative position. Pin 174 is secured to the tape recorder for limiting the movement of lever 163.

A swingable lever 168 is pivoted at 169 in the tape recorder and has its one end extending above pin 161 secured to shift plate 46 beyond the same while the other end has a bifurcation 168a in which a pin 172 secured to actuator 171 of a switch 170 is engaged. Lever 168 is urged in the clockwise direction by a spring 173 secured with its one end to lever 168 and with its other end to a stationary portion of the tape recorder so that lever 168 is held in a position in which the one end of lever 168 abuts against pin 161 of shift plate 46.

Switch 170 is set for reproducing operation of the tape recorder when recording knob 17 is held in its initial position, but, when recording knob 17 is actuated, pin 161 urges lever 168 in the anticlockwise direction so that switch 170 is switched for the recording operation.

Since recording knob 17 and recording/reproducing knob 18 must be actuated together when the recording operation is commenced, it is preferrable to provide engaging portions 68, 69 in the respective knobs 17, 18 so that recording knob 17 can be moved together with recording/reproducing knob 18 by actuating the latter after recording knob 17 has been moved in the first direction to engage portion 68 with portion 69.

Figure 4:
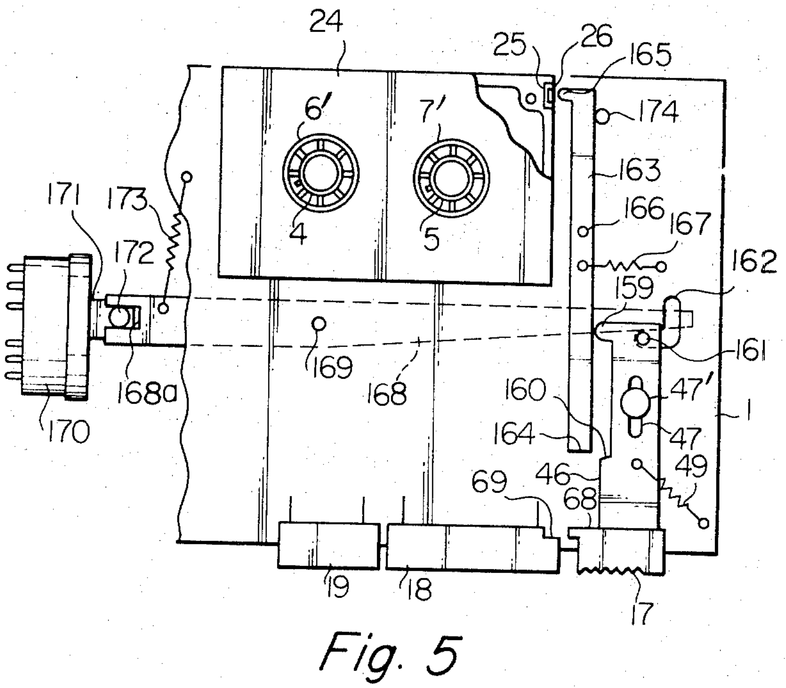
FIG. 4 is a fragmentary view showing the arrangement of another embodiment of the device of the present invention in its initial phase of operation.
Figure 5:
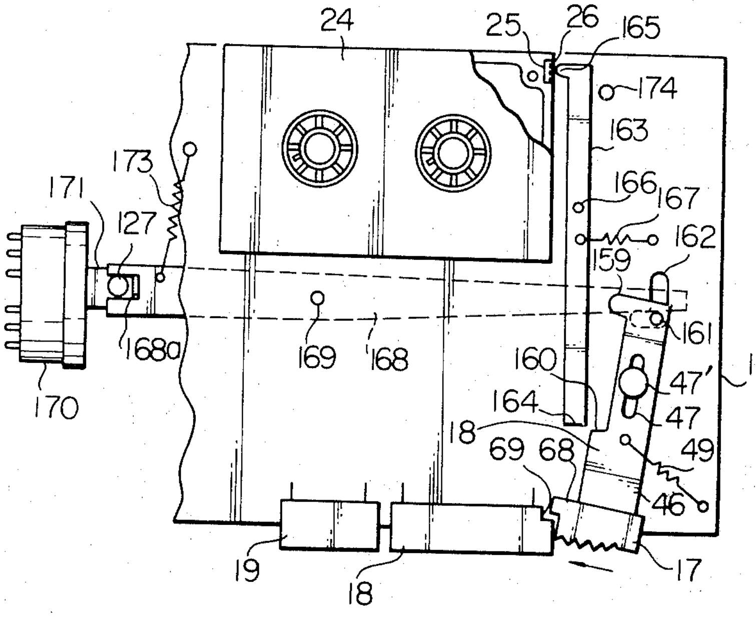
FIG. 5 to 7 are views similar to FIG. 4 but showing various phases of operation after the recording knob is actuated.
Figure 6:
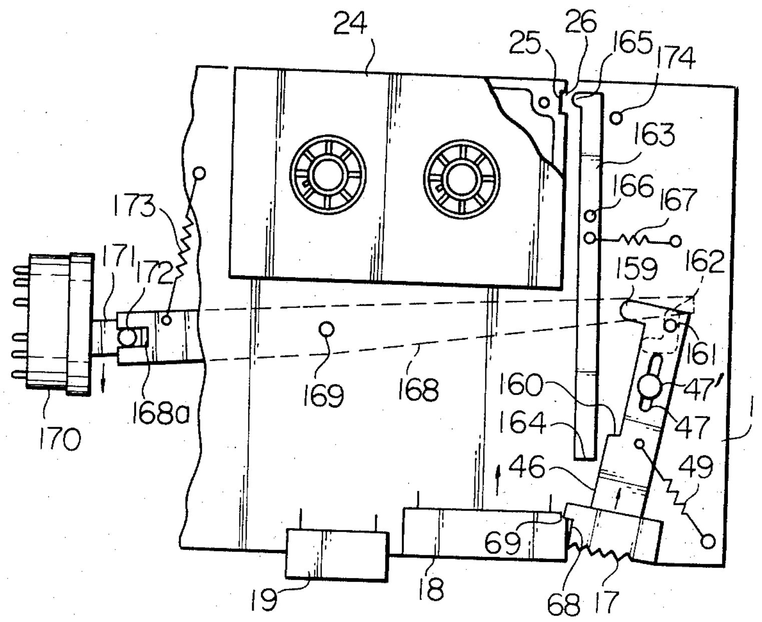

The operation of the device shown in FIGS. 4 – 7 is as follows. When a cassette 24 having a fin 26 in recess 25 is loaded and recording knob 17 is moved in the first direction as shown in FIG. 5, shift plate 46 is rotated in the clockwise direction to move ear 159 away from detecting lever 163 so that the same is rotated in the anticlockwise direction by the action of spring 167 and detecting nose 165 abuts against fin 26. As described previously, opposite end 164 of lever 163 does not engage with shoulder 160 of shift plate 46 in this condition, so that recording knob 17 can be moved in the second direction to bring the erasing head to its operative position as shown in FIG. 6 while switch 170 is switched for the recording operation, because lever 168 is rotated in the anticlockwise direction by pin 161 of shift plate 46.

Figure 7:
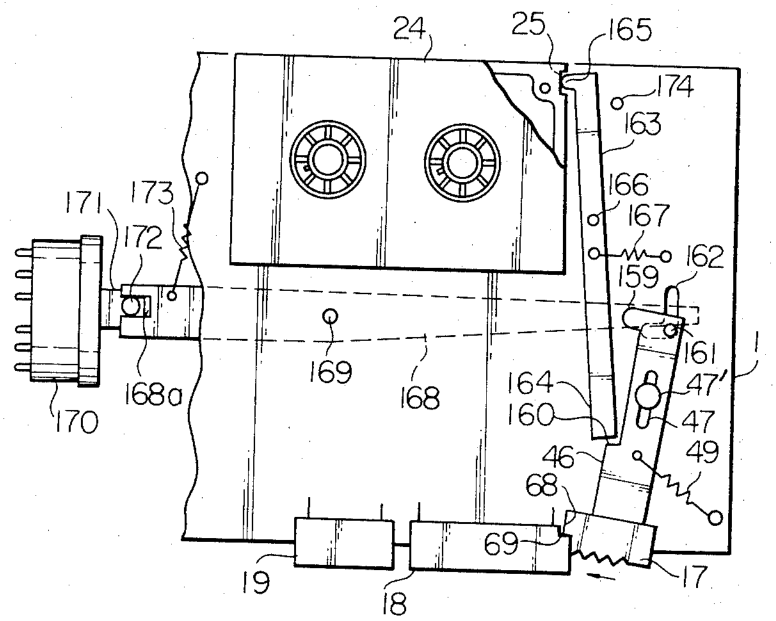

When a cassette 24 having no fin in recess 25 thereof is loaded and recording knob 17 is moved in the first direction to move ear 159 away from lever 163 as shown in FIG. 7, detecting nose 165 enters recess 25 to rotate lever 163 in the anticlockwise direction to the extent that end 164 of lever 163 engages with shoulder 160 of shift plate 46 to thereby prevent recording knob 17 from being moved in the second direction so that the erasing head is kept in its inoperable position.

Since detecting nose 165 is kept at all time apart from recess 25 by virtue of the provision of ear 159 in shift plate 46 when recording knob 17 is in its initial position, cassette 24 can be easily loaded and released without any obstruction by the detecting nose.

Figure 8:
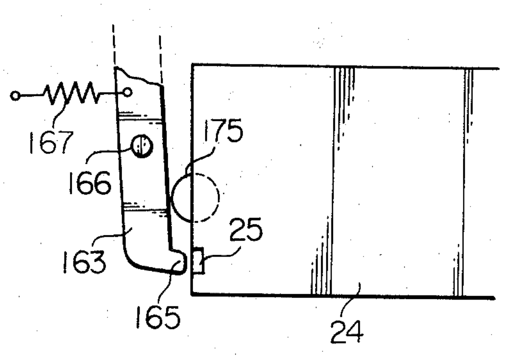
FIG. 8 is a fragmentary view showing a further embodiment of the present invention.
Figure 9:
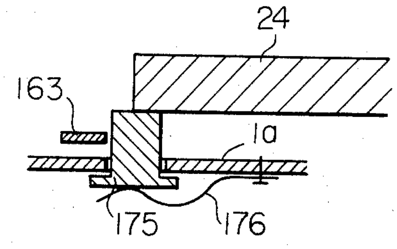
FIG. 9 is a sectional view of FIG. 8.

FIGS. 8 and 9 show a modification of the device of FIG. 4 which keeps the detecting nose 165 out of recess 25 of cassette 24 when recording knob 17 is in its initial position.

In this embodiment, a pin 175 having a flange at its lower end is slidably fitted in an opening formed in a base plate 1*a* in the tape recorder and urged upwardly by a spring 176 having one end secured to the lower surface of base plate 1a with the opposite end abutting against the lower end of pin 175. Pin 175 is located beneath cassette 24 to be loaded on the tape recorder adjacent to detecting lever 163 that, when no cassette is loaded on the tape recorder, pin 175 projects upwardly in the path of movement of detecting lever 163 so as to maintain detecting lever 163 in a position at which the detecting nose of lever 163 (not shown) is held apart from the encoding recess of the cassette so that the recording knob can be operated, while loading of the cassette is effected without any obstruction by the detecting nose moving into the path of movement of the cassette when pin 175 were not provided. When a cassette is loaded, pin 175 is urged downwardly by the cassette out of the path of movement of detecting lever 163 so that the detecting nose of lever 163 can properly sense the existence or non-existence of a fin in the encoding recess of the cassette.

Figure 10:
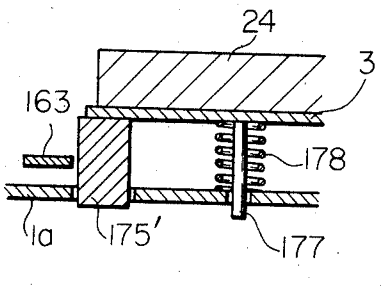
FIG. 10 is a sectional view of a modification of FIG. 9.

FIG. 10 shows a modification of FIG. 9. In this embodiment, pin 175' is fixedly secured to cassette loading deck 3 at its lower surface and pin 175' is slidably fitted in an opening formed in base plate 1*a*. Since deck 3 is normally urged to its first position by springs 178 one of which is illustrated in FIG. 10 when no cassette is loaded, pin 175' is located in the path of movement of detecting lever 163 as is the case of FIG. 9, while pin 175' is moved out of path of movement of lever 163 when cassette 24 is loaded on deck 3 and urged downwardly so as to lock cassette 24 in its operative position thereby permitting detecting lever 163 to be operated properly.

Figure 11:
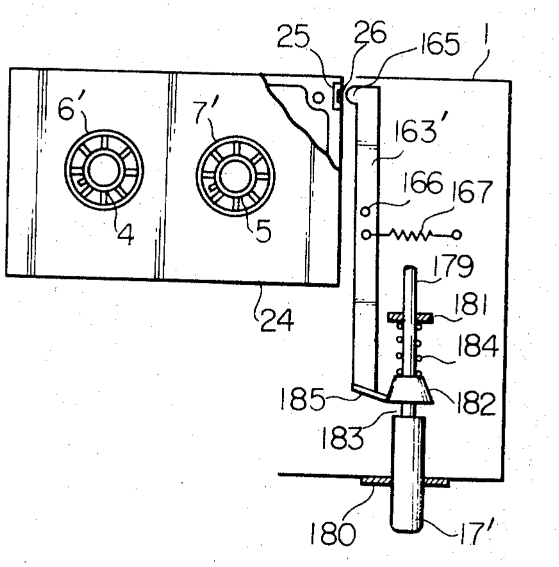
FIG. 11 is a fragmentary view showing the arrangement of a still further embodiment of the present invention in its initial phase of operation.
Figure 12:
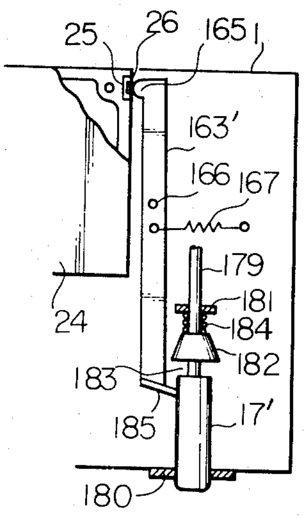
FIG. 12 and 13 are views similar to FIG. 11 but showing various phases of operation after the recording knob is actuated.
Figure 13:
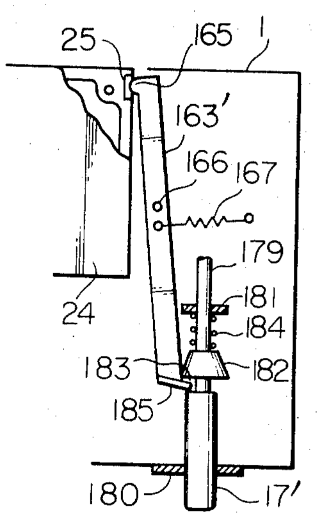

FIGS. 11 to 13 show a further embodiment of the device of the present invention. This embodiment is provided with a detecting lever 163' similar to detecting lever 163 shown in FIG. 4 except that the end opposite to the end at which detecting nose 165 is formed has an inclined bent lug or latch 185. Recording knob 17' of circular cross-section has a shaft 179 fixedly secured thereto and a conically shaped stopper member 182 is secured with a clearance 183 held between member 182 and recording knob 17'. The major diameter of stopper member 182 adjacent to knob 17' is made greater than that of knob 17'. Knob 17' and shaft 179 are slidably journaled in bearing plates 180 and 181, respectively, and a compression spring 184 is located around shaft 179 between bearing plate 181 and stopper member 182 so that knob 17' together with member 182 is normally urged outwardly of the tape recorder. In this position, inclined bent lug 185 abuts against the peripheral surface of stopper member 182 at its lower portion having greater diameter so that lever 163' is held in a position in which detecting nose 165 is maintained apart from recess 25 of cassette 24 loaded on the tape recorder.

In operation, when a cassette 24 having a fin 26 in recess 25 therein is loaded and recording knob 17' is actuated, inclined bent lug 185 is disengaged from stopper member 182 but is held in a position having a clearance from the outer surface of knob 17' because detecting nose 165 abuts against fin 26 so as to limit the rotation of lever 163' thereby permitting knob 17' to be further actuated for bringing the erasing head to its operative position. The return movement of knob 17' is allowed by virtue of the inclination of inclined bent lug 185 so as to return lever 163' to its initial position. On the other hand, when no fin is provided in recess 25 of cassette 24 loaded on the tape recorder and knob 17' is actuated, inclined bent lug 185 falls into clearance 183 because detecting nose 165 is moved into recess 25 to allow lever 163' to be further rotated in the anticlockwise direction. Thus, further actuation of knob 17' is prevented to maintain the erasing head in its inoperative position.

Figure 14:
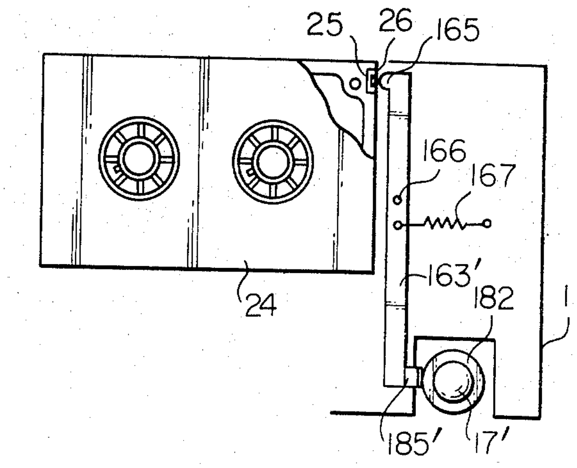
FIGS. 14 and 15 are views showing a modification of FIG. 11.
Figure 15:
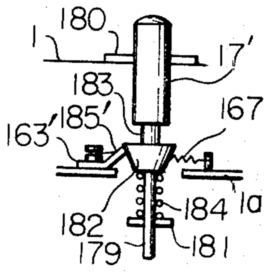

FIGS. 14 and 15 show a modification of the device of FIGS. 11 to 13. In this embodiment, the axis of shaft 179 is located perpendicular to the axis of shaft 179 in FIG. 11. However, the operation of the device is similar to that of FIGS. 11 to 13.

Figure 16:
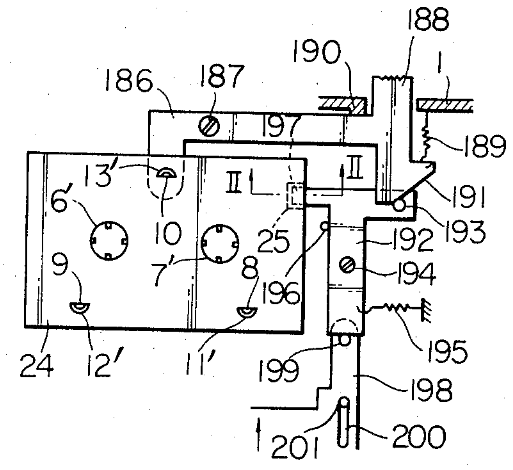
FIG. 16 is a fragmentary view showing the arrangement of a still other embodiment of the present invention.
Figure 17:
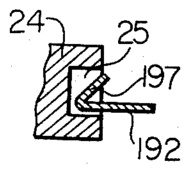
FIG. 17 is a fragmentary sectional view showing the detecting nose used in the device of FIG. 16.

FIGS. 16 and 17 show a further embodiment of the device of the present invention. In this embodiment, a cassette releasing lever 186 having a cassette releasing knob 188 is swingably supported at 187 in casing 1 of the tape recorder. Guide pin 10 is mounted on the inner end of lever 186 and lever 186 is normally urged in the anticlockwise direction by a spring 189 so that guide pin 10 is urged toward guide pins 8, 9 so as to lock cassette 24 in its operative position. Lever 186 is formed with an inclined cam edge 191. A T-shaped detecting lever 192 having a detecting nose 197 at one arm of the T-shape and a camming pin 193 at the other arm of the T-shape is pivoted at 194. Lever 192 is urged in the anticlockwise direction by a spring 195 so that pin 193 is urged to contact with inclined cam surface 191 of lever 186 while detecting nose 197 is urged to enter recess 25 of cassette 24.

A shift plate 198 mounting thereon a recording knob, not shown, and a pin 199 is slidably guided in the tape recorder by pin-slot engagement 200, 201 as shown. Shift plate 198 is movable in the direction of the stem of the T-shape of lever 192.

In operation, when a cassette 24 having no fin in recess 25 is loaded, detecting nose 197 enters recess 25 so that the outer end of the stem of the T-shape is located in the path of movement of pin 199 when the recording knob is actuated thereby preventing the recording knob from being further moved to bring the erasing head to its operative position. On the other hand, when a cassette 24 having a fin 26 in recess 25 is loaded, the movement of lever 192 in the anticlockwise direction is limited by the abutment of detecting nose 197 against fin 26 so that the outer end of the stem of lever 192 is moved out of the path of movement of pin 199 thereby permitting the recording knob to be actuated to bring the erasing head to its operative position. Pin 196 is provided for limiting excess movement of lever 192.

When cassette 24 is to be released, cassette releasing knob 188 is actuated to swing lever 186 in the clockwise direction to retract guide pin 10 from its locking position while pin 193 is urged rightwards so that detecting nose 197 is moved out of recess 25 thereby permitting cassette 24 to be released without hindrance by detecting nose 197.

An inclined portion may be formed in detecting nose 197 as shown in FIG. 17 so that loading of cassette 24 on the tape recorder is facilitated.

Figure 18:
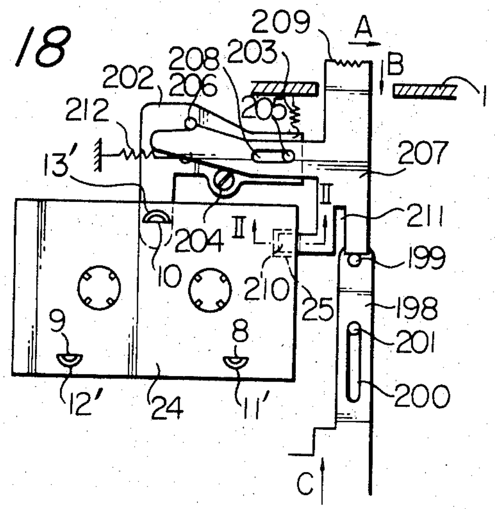
FIG. 18 is a fragmentary view showing the arrangement of a further embodiment of the present invention.
Figure 19:
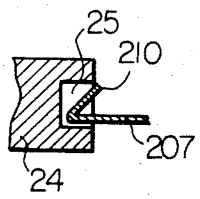
FIG. 19 is a fragmentary sectional view of the detecting nose used in the device of FIG. 18.
Figure 20:
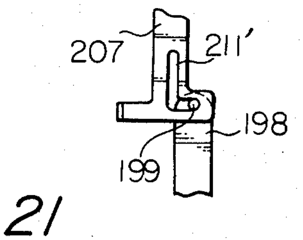
FIG. 20 is a fragmentary view showing a modification of the device of FIG. 18.

FIGS. 18 to 20 show a still further embodiment of the device of the present invention. In this embodiment, a swingable lever 202 mounting thereon guide pin 10 is pivoted by pivot shaft 204 in the tape recorder and urged in the anticlockwise direction by a spring 203 so that pin 10 is urged to its locking position. Lever 202 mounts thereon pins 205, 207. T-shaped cassette releasing lever 207 having cassette releasing knob 209 at its one arm is slidably mounted on swingable lever 202 by its elongated hole 208 slidably engaging with pin 205 of lever 202. Lever 207 is movable substantially in one direction indicated by arrow A parallel to hole 208 by the engagement of pin 206 and pivot shaft 204 slidably contacting with the respective sides of the stem of the T-shape of lever 207 and is normally urged by a spring 212 toward the left in the figure. A detecting nose 210 extends laterally from the outer end of the opposite arm of the T-shape so that detecting nose 210 is urged into encoding recess 25 of cassette 24 loaded on the tape recorder. The above described opposite arm of the T-shape of lever 207 is also provided with an open ended slot 211 extending in the direction B perpendicular to direction A.

A shift plate 198 having an abutting pin 199 similar to that shown in FIG. 16 is supported in the tape recorder by pin-slot engagement 200, 201 slidably in direction B. Pin 199 is so positioned that it abuts against the outer end of the arm of lever 207 having detecting nose 210 when lever 207 is urged to the left by spring 212 so that actuation of either of knob 209 and a recording knob (not shown) mounted on shift plate 198 is prevented but pin 199 is aligned with slot 211 when lever 207 is moved in direction A so that either of the recording knob together with shift plate 198 or cassette releasing knob 209 can be actuated.

The length of detecting nose 210 is so determined that, when a cassette having no fin in recess 25 is loaded, lever 207 is moved to the left to the extent that the outer end of the arm is moved in the path of movement of pin 199 while, when a cassette 24 having a fin 26 in recess 25 is loaded, detecting nose 210 abuts fin 26 to move lever 207 in direction A so that slot 211 is aligned with pin 199.

The operation of the device of FIG. 18 is clear from the above description. When a cassette 24 having a fin 26 in recess 25 is loaded, lever 207 is urged to the right by the abutment of detecting nose 210 against fin 26 to align slot 211 with pin 199 so that the recording knob can be actuated to bring the erasing head to its operative position. When a cassette 24 having no fin in recess 25 is loaded, lever 207 is moved to the left so that pin 199 abuts against the outer end of the arm of lever 207 to prevent the recording knob from being actuated. When cassette 24 is to be removed, nob 209 is first moved in direction A to align slot 211 with pin 199 and also move detecting nose 210 out of recess 25 and then moved in direction B so as to move guide pin 10 in its cassette releasing direction. In the device shown in FIG. 18, the actuation of cassette releasing knob 209 is positively prevented while the tape recorder is set for the recording operation, because pin 199 abuts against the bottom of slot 211 when the recording knob is moved and kept in its operative position thereby preventing lever 207 from moving in direction B.

An inclined portion may be provided in detecting nose 210 as shown in FIG. 19 so as to facilitate the loading of cassette 24 on the tape recorder.

FIG. 20 shows a modification of the device of FIG. 18 in which L-shaped slot 211′ is formed in lever 207 in place of open ended slot 211 of FIG. 18. The operation of slot 211′ of FIG. 19 is similar to slot 211 in FIG. 18.

Figure 21:
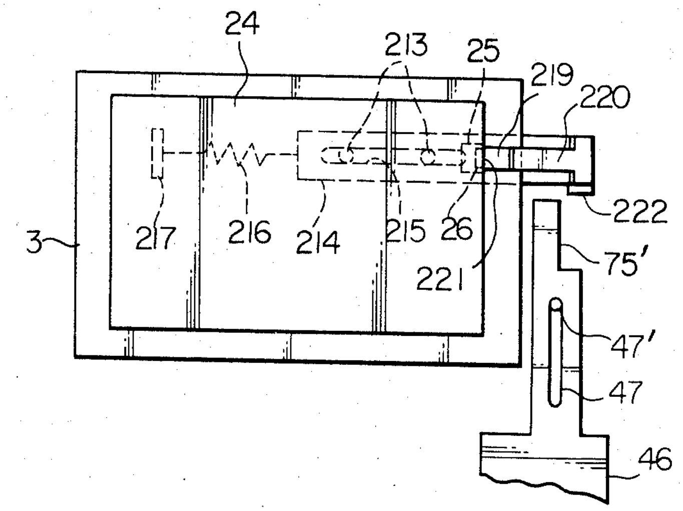
FIG. 21 is a fragmentary plan view showing the arrangement of a further embodiment of the present invention.
Figure 22:
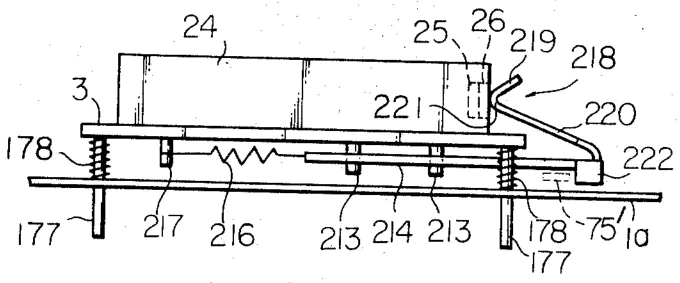
FIG. 22 is a side view of the device of FIG. 21.
Figure 23:
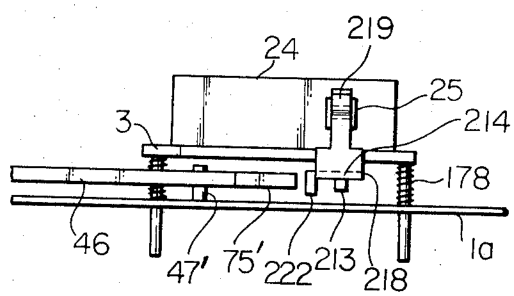
FIG. 23 is a front view as seen from the right in FIG. 21.

FIGS. 21 to 24 show a further embodiment of the device of the present invention. In this embodiment, a detecting plate 214 is slidably mounted on the lower surface of cassette loading deck 3 by pin-slot engagement 213, 215 and urged in the leftward direction as seen in FIG. 21 by a spring 216 with one end secured to the inner end of plate 214 and with the other end secured to depending piece 217 secured to deck 3. A connecting strip 220 is secured to the outer end of detecting plate 214 and a detecting nose 221 is formed at the free end of connecting strip 220 as shown. An inclined portion 219 may be formed in detecting nose 221 in like manner as the previously described embodiments. Detecting nose 221 is so located that it is urged into recess 25 of cassette 24 located on deck 3. A depending lug 222 is integrally formed at the outer end of plate 214. A shift plate 46 mounting thereon a recording knob is slidably supported in the tape recorder by pin-slot engagement 47, 47′ and inner end 75′ of plate 46 is located adjacent to depending lug 222 of detecting plate 214 so that, when a cassette 24 having no fin 26 in recess 25 is loaded on deck 3, detecting nose 221 moves into recess 25 thereby moving depending lug 222 into the path of movement of shift plate 46 so as to prevent the recording knob from being actuated. When a cassette 24 having a fin 26 in recess 25 is loaded on deck 3 as shown in FIGS. 21, 22, the leftward movement of detecting plate 214 is limited by the abutment of detecting nose 221 against fin 26 so that depending lug 222 of detecting plate 214 moves out of the path of movement of inner end 75′ of shift plate 46 so that the recording knob is permitted to be actuated to bring the erasing head to its operative position.

Figure 24:
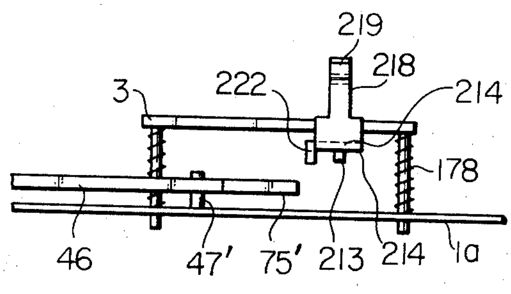
FIG. 24 is a view similar to FIG. 23 but showing the cassette loading deck moved to its lifted position.

When no cassette is loaded on deck 3 and the same is held in its first position, i.e., in the lifted position by springs 178 provided around guide shafts 177 secured to deck 3 between deck 3 and a base plate 1a through which guide shafts 177 slidably pass as shown in FIG. 24, depending lug 222 is moved above and out of the path of movement of inner end 75′ of shift plate 46 thereby permitting the recording head together with shift plate 46 to be actuated to bring the erasing head in its operative position. This facilitates for an unskilled operator to learn the operation of the tape recorder without a tape cassette loaded thereon.

Figure 25:
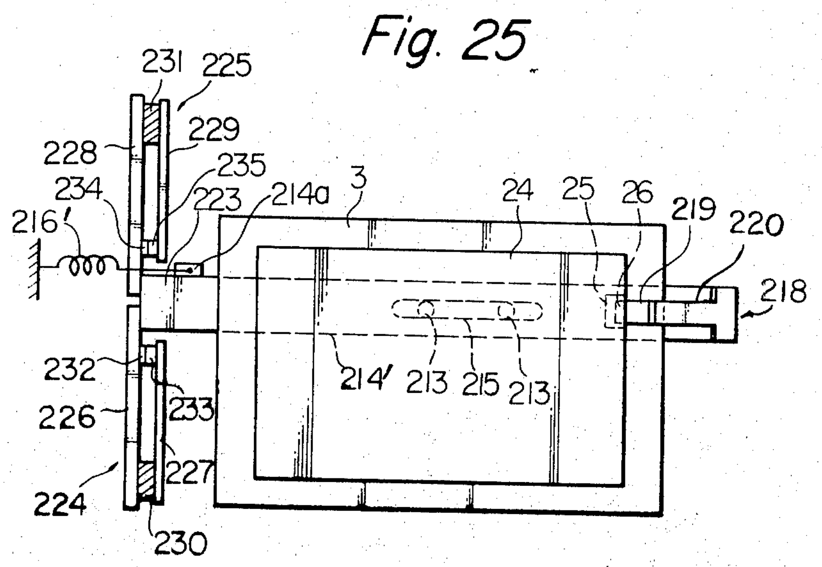
FIG. 25 is a plan view showing the arrangement of a still further embodiment of the present invention.
Figure 26:
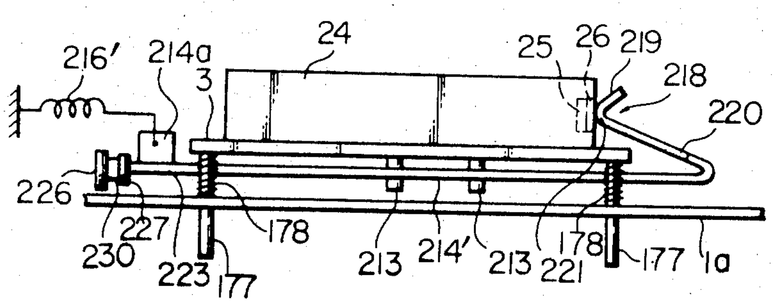
FIG. 26 is a side view of FIG. 25.
Figure 27:
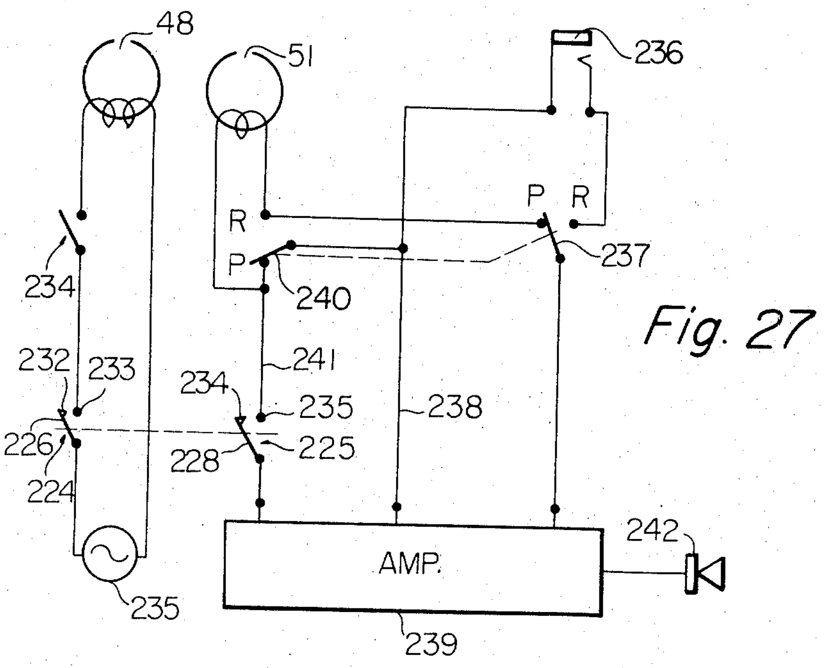
FIG. 27 is a circuit diagram incorporated in the device of FIG. 25.

FIGS. 25 to 27 show a still other embodiment of the device of the present invention. In this embodiment, the erasing head is rendered inoperable by opening the electric circuit of the erasing head when no fin is sensed in recess 25 of cassette 24 by the detecting nose.

In FIGS. 25, 26, detecting plate 214′ having detecting nose 221 is similar in construction as that shown in FIG. 21 except that end 223 of plate 214′ extends beyond deck 3 and plate 214′ is urged leftwardly by a spring 216′ secured at one end to lug 214a of plate 214′ while the opposite end of spring 216′ is secured to a stationary portion in the tape recorder. Switches 224 and 225 are provided adjacent to end 223 of plate 214′. Switch 224 comprises a movable contact arm 226 mounting thereon a contact 232 and a stationary contact arm 227 connected to movable contact arm 226 through insulating distance piece 230 and having a contact 233 mating with contact 232. In the similar way, switch 225 comprises a movable contact arm 228 having a contact 234′ and a stationary contact arm 229 having a mating contact 235′ and connected to arm 228 through insulating distance piece 231. The free end of each of movable contact arms 226, 228 extend toward each other adjacent to end 223 of plate 214′ in front thereof, so that when a cassette 24 having a fin 26 in recess 25 is loaded on deck 3, detecting plate 214′ is moved rightwards by the abutment of detecting nose 221 against fin 26 as shown in FIGS. 25, 26 so that switches 224, 225 are closed, while, when a cassette 24 having no fin in recess 25 is loaded, detecting nose 221 moves into recess 25 and detecting plate 214′ moves to the left to open both switches 224, 255.

An embodiment of the electric circuit of the device of FIGS. 25, 26 is shown in FIG. 27. Erasing head 48 is connected to erasing signal supply source 235 through switch 234 and switch 224. Switch 234 is coupled with a recording knob (not shown) so that switch 234 is closed when the recording knob is actuated to bring erasing head 48 to its operative position. One terminal of recording/reproducing head 51 is connected to an amplifier 239 through lead wire 241 in which switch 225 is connected. The other terminal of head 51 is connected to recording contact R of change over switch 240 having reproducing contact P and a switching arm movable between contacts R and P, and contact R of switch 240 is connected to reproducing contact P of another change over switch 237 having recording contact R and a movable arm movable between contacts P and R, the movable arm of switch 237 being connected to amplifier 239. The movable arm of switch 240 is connected to amplifier 239 through lead wire 238. One terminal of a microphone jack 236 is connected to lead wire 238 while the other terminal of jack 236 is connected to recording contact R of switch 237. As shown, a speaker 242 is connected to amplifier 239. Switches 237 and 240 are operatively coupled with each other so that, when switch 237 is switched to connect the movable arm to contact P or contact R, switch 240 is also switched to connect the movable arm to contact P or contact R for the reproducing or recording operation.

When the tape recorder is to be operated for the recording, a microphone plug is fitted in jack 236 and switches 237, 240 are switched to connect the movable arms to the respective recording contacts R while switch 234 is closed by the operation of the recording knob. Thus, the electric circuit is connected so that the input of the microphone to be recorded is supplied to amplifier 239 through switch 237 and lead wire 238 while the output of amplifier 239 is supplied to recording/reproducing head 51 through lead wire 238 and switch 240. However, when a cassette 24 having no fin in recess 25 is loaded, erasing head 48 and recording/reproducing head 51 are held inoperable because switches 224 and 225 are opened by the movement of detecting plate 214′ to the left, thereby preventing the information recorded on the tape from being erased.

When a cassette 24 having a fin 26 in recess 25 is loaded and the tape recorder is operated for the recording, switches 224 and 225 are closed and the electric circuit operates properly for the recording.

In the reproducing operation, switch 234 is opened and switches 237 and 240 are switched to connect the movable arms to the respective contacts P for the reproducing operation so that the output of recording/reproducing head 51 is supplied to amplifier 239 so as to actuate speaker 242 connected thereto. Since switch 225 is disconnected from the circuit set for the reproducing operation, the reproducing operation is carried out regardless of whether or not a fin 26 is provided in recess 25 of cassette 24.

Figure 28:
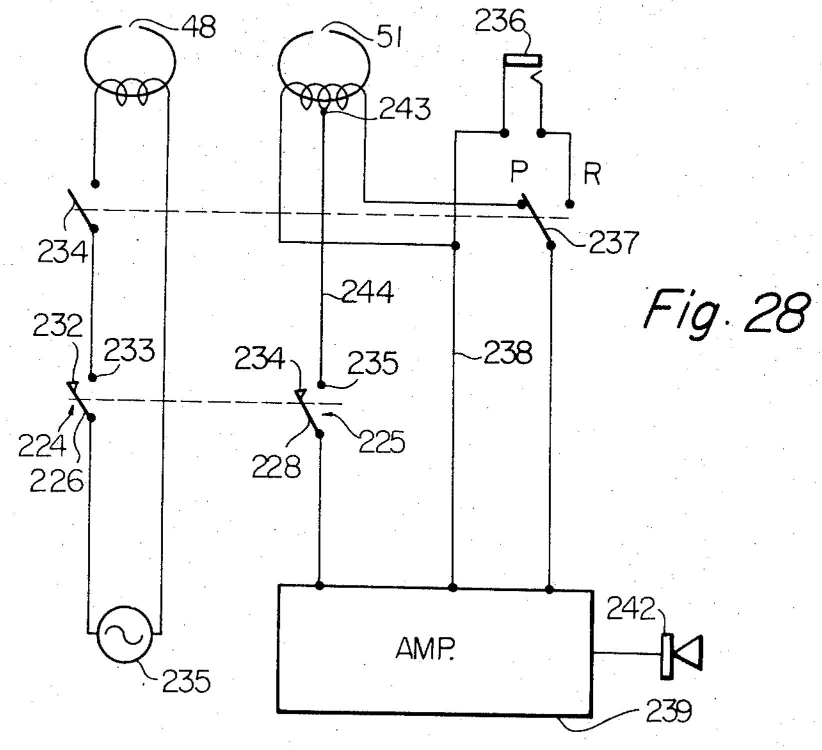
FIG. 28 is a circuit diagram modified from that of FIG. 27.

FIG. 28 shows a modification of the electric circuit of FIG. 27. In this embodiment, the electric circuit is substantially similar to that of FIG. 27 except that switch 234 is coupled with switch 237 so that switch 234 is closed when switch 237 is switched to connect contact R while switch 234 is opened when switch 237 is switched to connect contact P and that switch 240 is dispensed with and one terminal of recording/reproducing head 51 is directly connected to lead wire 238 while an intermediate tap 243 is provided in head 51 which is connected to amplifier 239 through lead wire 244 in which switch 225 is connected.

The operation of the electric circuit of FIG. 28 is similar to that of FIG. 27.

I claim:

1. Device for automatically preventing the erasing of information recorded on a tape loaded in a tape cassette for use with a tape recorder, said cassette having an encoding recess at one side wall of the casing thereof in which a fin is selectively provided to close said recess for indicating that the information on the tape in said cassette may be erased for further recording on said tape when the fin is provided in said recess while, when no fin is provided in said recess, indication is given that the information on said tape may not be erased, said tape recorder having a cassette loading deck movable between a first position in which the upper surface thereof is substantially flush with the outer surface of the casing of said tape recorder and a second position in which the cassette is loaded thereon in its operative position with the upper surface thereof substantially flush with the outer surface of the casing of said tape recorder, said deck being normally held in said first position, guide pins for releasably locking said cassette loaded on said deck in its operative position when said deck is moved to its second position, one of said guide pins being movable for releasing said cassette together with said deck when actuated, and a cassette releasing knob for actuating said one guide pin, said tape recorder having a recording knob for moving an erasing head to its operative position when said recording knob is moved and held in its operative position, a recording/reproducing knob for moving a recording/reproducing head to its operative position when moved and held in its operative position and a stopping knob for returning said recording knob and said recording/reproducing knob to their initial positions so as to bring said erasing head and said recording/reproducing head to their inoperative positions, wherein the improvement comprises a shift plate mounting thereon said recording knob, said shift plate having an L-shaped slot in which a pin secured to said tape recorder is slidably engaged so that said recording knob can first be moved in a first direction toward said recording/reproducing knob and then moved in a second direction toward the interior of said casing of said tape recorder for bringing said erasing head to its operative position but is prevented from moving in said second direction until it has been moved in said first direction, a first lever pivoted to said tape recorder and having a detecting nose at its one end which is adapted to be inserted into said encoding recess of said tape cassette mounted in position on said tape recorder, said first lever being urged by a spring in the direction to move said detecting nose into said recess, and a second lever pivoted to said tape recorder with one end being operatively coupled with the other end of said first lever so that said second lever is swung when said first lever is swung, said second lever being provided with a depending lug at its other end which overhangs over one side edge of said shift plate extending in the direction substantially parallel to said first direction of movement of said recording knob, said shift plate being provided with a cut-out portion in said one side edge which is so positioned that said depending lug is moved into said cut-out portion to prevent said recording knob together with said shift plate from moving in said first direction when no fin is provided in said recess so that said detecting nose is permitted to move into said recess thereby swinging said first lever and, hence, said second lever so as to move said depending lug into said cut-out portion, while said depending lug is prevented from moving into said cut-out portion to allow said recording knob together with said shift plate to move in said first direction when a fin is provided, in said encoding recess to limit the movement of said first lever and, hence, said second lever so as to maintain said depending lug disengaged from said cut-out portion thereby permitting said recording knob to be moved in the second direction for bringing said erasing head to its operative position.

2. Device according to claim 1, wherein said recording knob is coupled with said recording/reproducing knob when said recording knob is moved in said first direction so that the same is moved in said second direction together with said recording/reproducing knob when the latter is actuated.

3. Device according to claim 1, wherein said one guide pin is secured to one end of a third lever pivoted to said tape recorder and actuated by said cassette releasing knob, the other end of said third lever being provided with a pin secured thereto which is adapted to abut against said first lever to swing the same so that said detecting nose is disengaged from said encoding recess when said third lever is actuated to release the cassette loaded on said tape recorder thereby permitting said cassette to be released without hindrance by said detecting nose.

4. Device according to claim 1, wherein said cassette loading deck is provided with a depending lug adapted to abut against said first lever so as to limit the movement of said first lever and, hence, said second lever when said deck is moved to its first position so that said depending lug of said second lever is kept disengaged from said cut-out portion of said shift plate thereby permitting said recording knob to be actuated even though no cassette is loaded on said tape recorder.

5. Device for automatically preventing the erasing of information recorded on a tape loaded in a tape cassette for use with a tape recorder, said cassette having an encoding recess at one side wall of the casing thereof in which a fin is selectively provided to close said recess for indicating that the information on the tape in said cassette may be erased for further recording on said tape when the fin is provided in said recess while, when no fin is provided in said recess, indication is given that the information on said tape may not be erased, said tape recorder having a cassette loading deck movable between a first position in which the upper surface thereof is substantially flush with the outer surface of the casing of said tape recorder and a second position in which the cassette is loaded thereon in its operative position with the upper surface thereof substantially flush with the outer surface of the casing of said tape recorder, said deck being normally held in said first position while the cassette loaded on said deck is releasably locked in its operative position by locking means provided in said tape recorder when said deck is moved to said second position with said cassette loaded thereon, said tape recorder having a recording knob for moving an erasing head to its operative position, a recording/reproducing knob for moving a recording/reproducing head to its operative position and a stopping knob for returning said recording knob and said recording/reproducing knob to their initial positions so as to bring said erasing head and said recording/reproducing head to their inoperative positions, wherein the improvement comprises a shift plate mounting thereon said recording knob and provided with an ear at its inner end and a shoulder at its side edge, said shift plate having an elongated hole in which a pin secured to said tape recorder is slidably engaged and a pin secured to said shift plate which is slidably engaged in a L-shaped slot provided in said tape recorder so that said recording knob can first be moved in a first direction toward said recording/reproducing knob and then moved in a second direction toward the interior of said casing of said tape recorder for bringing said erasing head to its operative position but is prevented from moving in said second direction until it has been moved in said first direction, said shift plate being normally urged by a spring toward its initial position, a detecting lever pivoted to said tape recorder and having a detecting nose at its one end adapted to be inserted in said encoding recess of said cassette when the same is loaded in position on said tape recorder, the opposite end of said detecting lever terminating adjacent to said shoulder of said shift plate, said detecting lever being normally urged by a spring in the direction to move said detecting nose into said recess but held by said ear of said shift plate so that a clearance is held between said recess and said detecting nose when said recording knob is in its original position, and a swingable lever pivoted to said tape recorder and urged by a spring in the direction so that one end of said swingable lever abuts against said pin secured to said shift plate thereby permitting said swingable lever to be swung against the action of said spring by said pin when said recording knob is moved in said second direction, the opposite end of said swingable lever being operatively coupled with switching means for switching said tape recorder for the recording operation when said recording knob is moved to said second direction while said switching means being set for the reproducing operation when said recording knob is held in its initial position so that the reproducing operation is commenced by the actuation of said recording/reproducing knob, thereby permitting said detecting lever to be swung causing said detecting nose to be inserted into said encoding recess when no fin is provided therein so that said opposite end of said detecting lever engages with said shoulder of said shift plate when said recording knob together with said shift plate is moved in said second direction after the same has been moved in said first direction to move said ear of said shift plate apart from said detecting lever thereby preventing said recording knob from moving in said second direction to maintain said erasing head in its inoperative position, while, when a fin is provided in said encoding recess, the movement of said detecting lever is limited by the abutment of said detecting nose against said fin so that said opposite end of said detecting lever is kept apart from said shoulder of said shift plate to thereby permit said recording knob together with said shift plate to be moved in said second direction after the same has been moved in said first direction so that said erasing head is brought to its operative position with said swingable lever being swung for switching said switching means for the recording operation of said tape recorder.

6. Device according to claim 5, wherein said recording knob is coupled with said recording/reproducing knob when said recording knob is moged in said first direction so that the same is moved in said second direction together with said recording/reproducing knob when the latter is actuated.

7. Device for automatically preventing the erasing of information recorded on tape loaded in a tape cassette for use with a tape recorder, said cassette having an encoding recess at one side wall of the casing thereof in which a fin is selectively provided to close said recess for indicating that the information on the tape in said cassette may be erased for further recording on said tape when the fin is provided in said recess while, when no fin is provided in said recess, indication is given that the information on said tape may not be erased, said tape recorder having a cassette loading deck movable between a first position in which the upper surface thereof is substantially flush with the outer surface of the casing of said tape recorder and a second position in which the cassette is loaded thereon in its operative position with the upper surface thereof substantially flush with the outer surface of the casing of said tape recorder, said deck being normally held in said first position while the cassette loaded on said deck is releasably locked in its operative position by locking means provided in said tape recorder when said deck is moved to said second position with said cassette loaded thereon, said tape recorder having a recording knob for moving an erasing head to its operative position, a recording/reproducing knob for moving a recording/reproducing head to its operative position and a stopping knob for returning said recording knob and said recording/reproducing knob to their initial positions so as to bring said erasing head and said recording/reproducing head to their inoperative positions, said tape recorder being provided with a detecting lever swingably supported in said tape recorder and having a detecting nose at its one end, said detecting lever being biased by a spring so that said detecting nose is inserted into said encoding recess of said cassette loaded on said tape recorder when no fin is provided in said recess thereby preventing said recording knob from being actuated by the movement of said detecting lever so as to maintain said erasing head in its inoperative position while, when a fin is provided in said recess, the movement of said detecting lever is limited by the abutment of said detecting nose against said fin to thereby permit said recording knob to be actuated to move said erasing head to its operative position, wherein the improvement comprises a pin slidably provided in said tape recorder adjacent to said detecting lever and normally urged by a spring into the path of movement of said detecting lever so as to prevent said detecting lever from moving to the position to cause said recording knob to be inoperative, said pin being so positioned that the same is urged against the action of said spring to a position out of the path of movement of said detecting lever by the cassette when loaded on said tape recorder thereby permitting said recording knob to be operated when no cassette is loaded on said tape recorder.

8. Device according to claim 7, wherein said pin is fixedly secured to said cassette loading deck at the lower surface thereof.

9. Device for automatically preventing the erasing of information recorded on a tape loaded in a tape cassette for use with a tape recorder, said cassette having an encoding recess at one side wall of the casing thereof in which a fin is selectively provided to close said recess for indicating that the information on the tape in said cassette may be erased for further recording other information on said tape when the fin is provided in said recess while, when no fin is provided in said recess, indication is given that the informations on said tape may not be erased for maintaining the informations recorded thereon, said tape recorder having a cassette loading deck movable between a first position in which the upper surface thereof is substantially flush with the outer surface of the casing of said tape recorder and a second position in which the cassette is loaded thereon in its operative position with the upper surface thereof substantially flush with the outer surface of the casing of said tape recorder, said deck being normally held in said first position while the cassette loaded on said deck is releasably locked in its operative position by locking means provided in said tape recorder when said deck is moved to said second position with said cassette loaded thereon, said tape recorder having a recording knob normally urged outwardly but manually operated to be moved inwardly of said tape recorder for moving an erasing head to its operative position, a recording/reproducing knob for moving a recording/reproducing head to its operative position and a stopping knob for returning said recording knob and said recording/reproducing knob to their initial positions so as to bring said erasing head and said recording/reproducing head to their inoperative positions, wherein the improvement comprises a detecting lever swingably supported in said tape recorder and having a detecting nose at its one end, said detecting lever being urged by a spring so that said detecting nose is inserted into said encoding recess of said cassette loaded on said tape recorder when no fin is provided in said recess thereby preventing said recording knob from being actuated by the movement of said detecting lever so as to maintain said erasing head in its inoperative position while, when a fin is provided in said recess, the movement of said detecting lever is limited by the abutment of said detecting nose against said fin to thereby permit said recording knob to be actuated to move said erasing head to its operative position, said detecting lever being provided with an inclined bent lug at its opposite end, said recording knob being secured to a shaft on which a conically shaped stopper member having a major diameter greater than that of said recording knob is fixedly mounted with a clearance being held between said stopper member and said recording knob, said inclined bent lug normally abutting against said stopper member so as to arrest said detecting lever in a position so as to position said detecting nose spaced from said encoding recess, thereby permitting said detecting lever to be swung so that said detecting nose is inserted into said recess when no fin is provided therein thereby causing said inclined bent lug to be engaged in said clearance between said stopper member and said recording knob so as to prevent the actuation of said recording knob when the same is actuated thus maintaining said erasing head in its inoperative position while, when a fin is provided in said recess, the movement of said detecting lever is limited by the abutment of said detecting nose against said fin so as to allow said inclined bent lug to move over said recording knob when the same is actuated thereby permitting said erasing head to be brought to its operative position, said recording knob being allowed to return to its initial position by virtue of the inclination of said bent lug abutting against said upper member during the returning movement of said recording knob.

10. Device for automatically preventing the erasing of information recorded on a tape loaded in a tape cassette for use with a tape recorder, said cassette having an encoding recess at one side wall of the casing thereof in which a fin is selectively provided to close said recess for indicating that the information on the tape in said cassette may be erased for further recording on said tape when the fin is provided in said recess while, when no fin is provided in said recess, indication is given that the information on said tape may not be erased, said tape recorder having a cassette loading deck movable between a first position in which the upper surface thereof is substantially flush with the outer surface of the casing of said tape recorder and a second position in which the cassette is loaded thereon in its operative position with the upper surface thereof substantially flush with the outer surface of the casing of said tape recorder, said deck being normally held in said first position, guide pins for releasably locking said cassette loaded on said deck in its operative position when said deck is moved to said second position, one of said guide pins being movable for releasing said cassette together with said deck when actuated, and a cassette releasing knob for actuating said one guide pin, said tape recorder having a recording knob for moving an erasing head to its operative position, a recording/reproducing knob for moving a recording/reproducing head to its operative position and a stopping knob for returning said recording knob and said recording/reproducing knob to their initial positions so as to bring said erasing head and said recording/reproducing head to their inoperative positions, wherein the improvement comprises a cassette releasing lever pivoted to said tape recorder and mounting thereon said cassette releasing knob and said one guide pin, said cassette releasing lever being provided with an inclined cam edge, a shift plate mounting thereon said recording knob and an abutting pin, said shift plate being located in spaced relationship from said cassette releasing lever and supported in said tape recorder movably in the direction toward and away from said cassette releasing lever, and a T-shaped erasing preventing lever pivotally supported intermediate said cassette releasing lever and said shift plate and having a detecting nose at an arm of the T-shape of said lever and a camming pin at the other arm of said T-shape, said erasing preventing lever being urged by a spring in the direction to move said camming pin in contact with said inclined cam edge and said detecting nose into said encoding recess of said cassette loaded on said tape recorder with the outer end of the stem of said T-shape being aligned with said abutting pin of said shift plate when no fin is provided therein, thereby preventing said recording knob from being actuated by the abutment of said abutting pin against said outer end of the stem of said T-shape of said erasing preventing lever so that said erasing head is kept in its inoperative position, while, when a fin is provided in said recess, said erasing preventing lever is swung by the abutment of said detecting nose against said fin so that said outer end of the stem of said T-shape is moved out of the path of movement of said abutting pin to thereby permit said recording knob to be actuated to bring said erasing head to its operative position, said detecting nose being moved apart from said recess when said cassette releasing knob is actuated by virtue of the camming action of said camming pin contacting said inclined cam edge so that said cassette is released without hindrance by said detecting nose.

11. Device according to claim 10, wherein said detecting nose is provided with an inclined portion so as to move said erasing preventing lever out of the path of movement of said cassette by the engagement of said inclined portion with a cassette when the same is loaded on said tape recorder thereby permitting said cassette to be loaded on said tape recorder without being obstructed by said erasing preventing lever.

12. Device for automatically preventing the erasing of information recorded on a tape loaded in a tape cassette for use with a tape recorder, said cassette having an encoding recess at one side wall of the casing thereof in which a fin is selectively provided to close said recess for indicating that the information on the tape in said cassette may be erased for further recording on said tape when the fin is provided in said recess while, when no fin is provided in said recess, indication is given that said tape may not be erased, said tape recorder having a cassette loading deck movable between a first position in which the upper surface thereof is substantially flush with the outer surface of the casing of said tape recorder and a second position in which the cassette is loaded thereon in its operative position with the upper surface thereof substantially flush with the outer surface of the casing of said tape recorder, said deck being normally held in said first position, guide pins for releasably locking said cassette loaded on said deck in its operative position when said deck is moved to said second position, one of said guide pins being movable for releasing said cassette together with said deck when actuated, and a cassette releasing knob for actuating said one guide pin, said tape recorder having a recording knob for moving an erasing head to its operative position, a recording/reproducing knob for moving a recording/reproducing head to its operative position and a stopping knob for returning said recording knob and said recording/reproducing knob to their initial position so as to being said erasing head and said recording/reproducing head to their inoperative positions, wherein the improvement comprises a swingable lever pivoted to the tape recorder and mounting thereon said one guide pin, said swingable lever being normally urged by a spring in the direction to releasably lock a tape cassette loaded in position on said tape recorder, a T-shaped cassette releasing lever mounting said cassette releasing knob on one arm of the T-shape of said cassette releasing lever and having a detecting nose and a slot at the opposite arm of said T-shape, the stem of said cassette releasing lever being slidably mounted on said swingable lever so that said cassette releasing lever is movable in opposite directions on said swingable lever between a first position in which said detecting nose is inserted into said encoding recess of a cassette loaded on said tape recorder and a second position in which said detecting nose is spaced from said recess, said cassette releasing lever being normally urged in the direction toward said first position, and a shift plate mounting thereon said recording knob and having an abutting pin, said shift plate being shiftably located in said tape recorder so that said abutting pin abuts against a portion of said opposite arm of said cassette releasing lever when said recording knob is actuated while said cassette releasing lever is in said first position, said slot in said opposite arm of said cassette releasing lever being so located that said slot is aligned with the path of movement of said abutting pin of said shift plate when said detecting nose abuts against a fin provided in said encoding recess to limit the movement of said cassette releasing lever toward said first position by the abutment of said detecting nose against said fin, thereby permitting said recording knob to be actuated to bring said erasing head to its operative position while said recording knob is prevented from being actuated when no fin is provided in said recess to maintain said erasing head in its inoperative position, said cassette releasing knob being actuated to swing said swingable lever so as to release said cassette only after said cassette releasing knob is first moved so as to move said cassette releasing lever toward said second position until said slot is aligned with said abutting pin at which position said detecting nose is moved out of said encoding recess so that said cassette can be released without obstructions by said detecting nose.

13. Device according to claim 12, wherein said detecting nose is provided with an inclined portion to facilitate the loading of a cassette on said tape recorder.

14. Device according to claim 12, wherein said slot in said cassette releasing lever is L-shaped having a portion extending in the direction of the movement of said abutting pin and another portion extending in the direction parallel to the movement of said cassette releasing lever on said swingable lever.

15. Device for automatically preventing the erasing of information recorded on tape loaded in a tape cassette for use with a tape recorder, said cassette having an encoding recess at one side wall of the casing thereof in which a fin is selectively provided to close said recess for indicating that the informations on the tape in said cassette may be erased for further recording on said tape when the fin is provided in said recess while, when no fin is provided in said recess, indication is given that said tape may not be erased, said tape recorder having a cassette loading deck movable between a first position in which the upper surface thereof is substantially flush with the outer surface of the casing of said tape recorder and a second position in which the cassette is loaded thereon in its operative position with the upper surface thereof substantially flush with the outer surface of the casing of said tape recorder, said deck being normally held in said first position while the cassette loaded on said deck is releasably locked in its operative position by locking means provided in said tape recorder when said deck is moved to said second position with said cassette loaded thereon, said tape recorder having a recording knob normally urged outwardly but manually operated to be moved inwardly of said tape recorder for moving an erasing head to its operative position, a recording/reproducing knob for moving a recording/reproducing head to its operative position and a stopping knob for returning said recording knob and said recording/reproducing knob to their initial positions so as to being said erasing head and said recording/reproducing head to their inoperative positions, wherein the improvement comprises a detecting plate slidably mounted on the lower surface of said cassette loading deck and having a detecting nose connected to one end of said detecting plate through a connecting strip and a depending lug at said end, said detecting plate being normally urged by a spring so that said detecting nose is moved into said encoding recess of a cassette loaded on said deck, and a shift plate mounting thereon said recording knob and slidable inwardly of the tape recorder in the direction substantially perpendicular to the direction of movement of said detecting plate when said recording knob is actuated, the inner end of said shift plate being so located that, when no fin is provided in said encoding recess of the cassette loaded on said tape recorder and said detecting nose is moved into said recess, said inner end of said shift plate abuts against said depending lug when said recording knob is actuated thereby preventing said erasing head from being moved to its operative position while, when a fin is provided in said recess, the movement of said detecting nose is limited to thereby locate said depending lug out of the path of movement of said inner end of said shift plate so that said recording knob is allowed to be actuated so as to bring said erasing head to its operative position, said recording knob being permitted to be operated when no cassette is loaded on the tape recorder and, hence, said deck is in said first position by virtue of the location of said depending lug above and out of the path of movement of said inner end of said shift plate.

16. Device according to claim 15, wherein said detecting nose is provided with an inclined portion for facilitating the loading of said cassette in position on said deck.

17. Device for automatically preventing the erasing of information recorded on a tape loaded in a tape cassette for use with a tape recorder, said cassette having an encoding recess at one side wall of the casing thereof in which a fin is selectively provided to close said recess for indicating that the tape in said cassette may be erased for further recording when the fin is provided in said recess while, when no fin is provided in said recess, indication is given that said tape may not be erased, said tape recorder having a cassette loading deck movable between a first position in which the upper surface thereof is substantially flush with the outer surface of the casing of said tape recorder and a second position in which the cassette is loaded thereon in its operative position with the upper surface thereof substantially flush with the outer surface of the casing of said tape recorder, said deck being normally held in said first position while the cassette loaded on said deck is releasably locked in its operative position by locking means provided in said tape recorder when said deck is moved to said second position with said cassette loaded thereon, said tape recorder having a first electric circuit connecting said erasing head and an erasing signal supply means through switch means closed when said tape recorder is set for the recording operation and a second electric circuit including said recording/reproducing head having switch means for switching said second electric circuit for either of the recording and reproducing operations wherein the improvement comprises a detecting plate slidably mounted on the lower surface of said cassette loading deck and having a detecting nose connected to one end of said detecting plate through a connecting strip, said detecting plate being normally urged by a spring so that said detecting nose is moved into said encoding recess of a cassette loaded on said deck, and a pair of switches so located adjacent to the opposite end of said detecting plate that said pair of switches are opened when said detecting nose is moved into said encoding recess of a cassette loaded on said deck when no fin is provided therein, while they are closed when the movement of said detecting nose is limited by a fin provided in said recess, one of said pair of switches being connected in said first electric circuit while the other of said pair of switches is connected in said second electric circuit when said switch means is switched for the recording operation, thereby permitting said erasing head to be rendered inoperative and said recording/reproducing head to be held operative when no fin is provided in said encoding recess while both said erasing head and said recording/reproducing head are held operative when a fin is provided in said encoding recess.

18. In a tape recorder adapted to receive either a first tape cassette having an accessible recess in an outer wall thereof or a second tape cassette not having said recess, the recorder having a casing, locking means for locking either one of said cassettes to said casing in an operative position of said one cassette, a cassette releasing member manually operable on said casing for unlocking said one cassette from said operative position thereof, an erasing head, a moving member connected to said erasing head and manually operable for moving said erasing head into an operative position relative to said locked cassette, the improvement which comprises:

a. guide means for guiding said moving member in a path during manual operation thereof;

b. a detecting member movable on said casing into and away from a position in which a portion of said detecting member is received in the recess of said first cassette when the same is locked in said operative position;

c. yieldably resilient means biasing said detecting member toward said position thereof;

d. latch means operatively interposed between said detecting member and said moving member for preventing movement of said moving member in said path in a direction for moving said erasing head into the operative position thereof, when said detecting member is in said position thereof, while permitting said movement of said moving member when said detecting member is held out of said position thereof by said second cassette being locked to said casing by said locking means; and e. means for preventing said detecting member from moving into said position thereof when no cassette is in said operative position.

19. In a tape recorder as set forth in claim 18, said path being L-shaped and having two consecutive portions transverse to each other, said latch means preventing movement of said moving member in one of said portions.

20. In a tape recorder as set forth in claim 18, said latch means being fixedly fastened to said detecting member and engaging said moving member when in said position thereof.

21. In a tape recorder adapted to receive either a first tape cassette having an accessible recess in an outer wall thereof or a second tape cassette not having said recess, the recorder having a casing, locking means for locking either one of said cassettes to said casing in an operative position of said one cassette, a cassette releasing member manually operable on said casing for unlocking said one cassette from said operative position thereof, an erasing head, a source of an erasing signal in circuit with said head for erasing information from tape in said locked cassette by means of said erasing signal transmitted to said head, the improvement which comprises:

a. a detecting member movable on said casing toward and away from a position in which a portion of said detecting member is received in the recess of said first cassette, when the same is locked in said operating position;

b. yieldably resilient means biasing said detecting member toward said position thereof;

c. switch means in said circuit;

d. latch means operatively interposed between said detecting member and said switch means for interrupting said circuit and thereby preventing erasing of said information by said signal when said detecting member is in said position thereof while permitting transmission of said signal by said switch means when said detecting member is held out of said position thereof by said second cassette being locked to said casing by said locking means; and e. means for preventing said detecting member from moving into said position thereof when no cassette is in said operative position.

* * * * *